United States Patent [19]
Green et al.

[11] Patent Number: 5,711,251
[45] Date of Patent: Jan. 27, 1998

[54] GERMICIDE APPLICATOR FOR COW UDDERS

[75] Inventors: Thomas S. Green, Atwater; Eric G. Hilston, Streetsboro, both of Ohio

[73] Assignee: ABC Dispensing Technologies, Inc., Akron, Ohio

[21] Appl. No.: 626,987

[22] Filed: Apr. 3, 1996

[51] Int. Cl.⁶ ........................................................ A01J 7/04
[52] U.S. Cl. ...................................................... 119/670
[58] Field of Search ................................... 119/650, 651, 119/659, 662, 665, 670; 239/127, 306, 307, 310

[56] References Cited

U.S. PATENT DOCUMENTS

| | | | |
|---|---|---|---|
| 2,397,855 | 4/1946 | Grams | 119/665 |
| 2,532,251 | 11/1950 | Whitmire et al. | 119/665 |
| 2,731,300 | 1/1956 | Jansen | 119/670 |
| 3,713,423 | 1/1973 | Sparr, Sr. | 119/670 |
| 4,305,346 | 12/1981 | Sparr, Sr. | 119/670 |
| 4,669,425 | 6/1987 | Cook | 119/670 |
| 4,903,639 | 2/1990 | Kessel | 119/670 |
| 5,535,700 | 7/1996 | Boudreau | 119/651 |

*Primary Examiner*—John G. Weiss
*Assistant Examiner*—David J. Cho
*Attorney, Agent, or Firm*—Renner, Kenner, Greive, Bobak, Taylor & Weber

[57] ABSTRACT

A germicide applicator for cow udders incorporates a dispensing wand having a dispensing ring at an end thereof for applying a germicide solution to the teats of a cow. The dispensing ring has a central aperture sized to receive a teat and allow for the spraying of germicide from circumferentially spaced spray nozzles therein. A source of lactic acid and a source of sodium chlorite are provided in communication with the spray gun and are driven by respective pumps. Valves in the spray gun are actuated by a trigger and allow for the metering of both lactic acid and sodium chlorite in a common conduit within a wand, where they are mixed in the appropriate relationship to achieved the desired germicide. Float valves used in association with the sources of lactic acid and sodium chlorite shut down the pumps when an adequate supply of either is absent.

19 Claims, 2 Drawing Sheets

5,711,251

GERMICIDE APPLICATOR FOR COW UDDERS

TECHNICAL FIELD

The invention herein resides in the art of dispensing apparatus and, more particularly, to apparatus adapted for mixing and dispensing multiple fluids in predetermined ratios. More specifically, the invention relates to an apparatus for mixing and applying germicides to cow udders prior to milking.

BACKGROUND ART

Modern dairy farms operate extremely systematically. The cows from the herd are cycled through the milking operation in shifts, with a particular number of cows being milked at any point in time such that the entire herd is fully milked over the course of a day. Typically, each cow involved is milked twice during the day. A significant portion of the milking process is cleaning of the cows' udders prior to attachment of the automatic milking machines to the teats. This is particularly important, and generally required by law, to prevent any infecting of the milk and to preclude the transfer of disease from one cow to another within the herd.

Previously, two different techniques for the cleaning of cows' udders prior to milking have been undertaken. According to one technique, the wash mixture comprises a composition of lactic acid and sodium chlorite. According to the prior art, the formulation was typically premixed in a container and then sprayed from the container onto the udders and teats. Premixing of the cleaning solution has been found not only to be time consuming, but has also been given to a low shelf life of the mixed solution. While lactic acid and sodium chlorite separately have extensive shelf lives, the shelf life of the mixed solution is quite short. The short shelf life, coupled with the cost of the solution itself, requires only the exact amounts of solution necessary be mixed at any point in time to minimize loss due to waste. Moreover, the final wash is extremely corrosive, requiring implementation in a costly stainless steel system. Even utilizing such apparatus, corrosion is found to take its toll.

Additionally, in the prior art it has typically been known to use a spray wand with a mist nozzle at the end to spray the entire udder area of the cow, well beyond the teats themselves which are ultimately attached to the milking machine. It will be appreciated that cleanliness of the teats is of primary importance, and not the milk sack or udder itself. The prior art spraying devices, accordingly, also have been given to a high degree of waste, since the spray is emitted in a rather broad band and is not well focused for cleaning the teats alone. Moreover, to be certain that the full circumference of each teat has been cleaned, it is necessary that the spray fully circumscribe the teat—adding further to the element of waste.

The prior an has also taught the use of a dipping mechanism for dipping each of the cow's teats into an appropriate germicide such as iodine or the like. This type of operation is quite time consuming, in that each of cow teats must be emersed in the solution of the container. Additionally, the transmittal of disease from one cow to another throughout the herd is enhanced by this type of technique, since the solution is effectively reused—as is the receptacle or container itself.

It is also known that the constituent ingredients of the wash composition are often harmful to the cow, when taken alone, but are not harmful to the cow when applied in an appropriate mixture in the form of a germicide. Accordingly, it is necessary in any germicide applicator to provide means to guarantee that the germicide is applied to the cow only in the proper mixture, and not in such a manner that any of the ingredients alone contacts the cow's udders.

There is a need in the art for an efficient apparatus which may be employed for washing and cleansing cow teats prior to the milking operation and which eliminates the waste and labor intensity of the prior art, while also minimizing the effect of the corrosive nature of the mixtures on the associated apparatus.

There is further a need in the art for a germicide applicator for cows udders which assures that the constituent ingredients of the germicide not come into contact with the cow, apart from being present in the germicide mixture.

DISCLOSURE OF INVENTION

In light of the foregoing, it is a first aspect of the invention to provide a germicide applicator for cow udders which minimizes waste by accommodating a very direct and highly focused application of the germicide to the cow teats.

Another aspect of the invention is the provision of a germicide applicator for cow udders which does not require premixing of the constituent ingredients, but which allows for mixing of the ingredients immediately prior to dispensing and within a dispensing gun itself to thus minimize the impact of the corrosive nature of the solution.

A further aspect of the invention is the provision of a germicide applicator for cow udders in which the mixing of the ingredients is in the air, apart from the dispensing gun, such that the corrosive mixture is presented totally externally to the applicator.

Still a further aspect of the invention is the provision of germicide applicator for cow udders which substantially eliminates the transfer of disease from one cow to the others throughout the herd during the cleaning operation.

Yet an additional aspect of the invention is the provision of a germicide applicator for cow udders which includes a safety shut-off to preclude the application of either ingredient to the cow alone.

The foregoing and other aspects of the invention which will become apparent as the detailed description proceeds are achieved by a germicide applicator for cow udders, comprising: a plurality of supply sources for constituent ingredients of the germicide; a plurality of dispensing lines, a separate dispensing line in communication with each of said supply sources at said first ends thereof; a dispensing gun interconnected with said dispensing lines at second ends thereof; pump means in association with each of said supply sources for urging the constituent ingredients from said supply sources, through said dispensing lines, and out of said dispensing gun; and means interconnecting said plurality of dispensing lines for mixing the constituent ingredients into a germicide to be applied to a cow teat.

BRIEF DESCRIPTION OF THE DRAWINGS

For a complete understanding of the objects, techniques, and structure of the invention reference should be made to the following detailed description and accompanying drawing wherein.

BEST MODE FOR CARRYING OUT THE INVENTION

Figure 1:
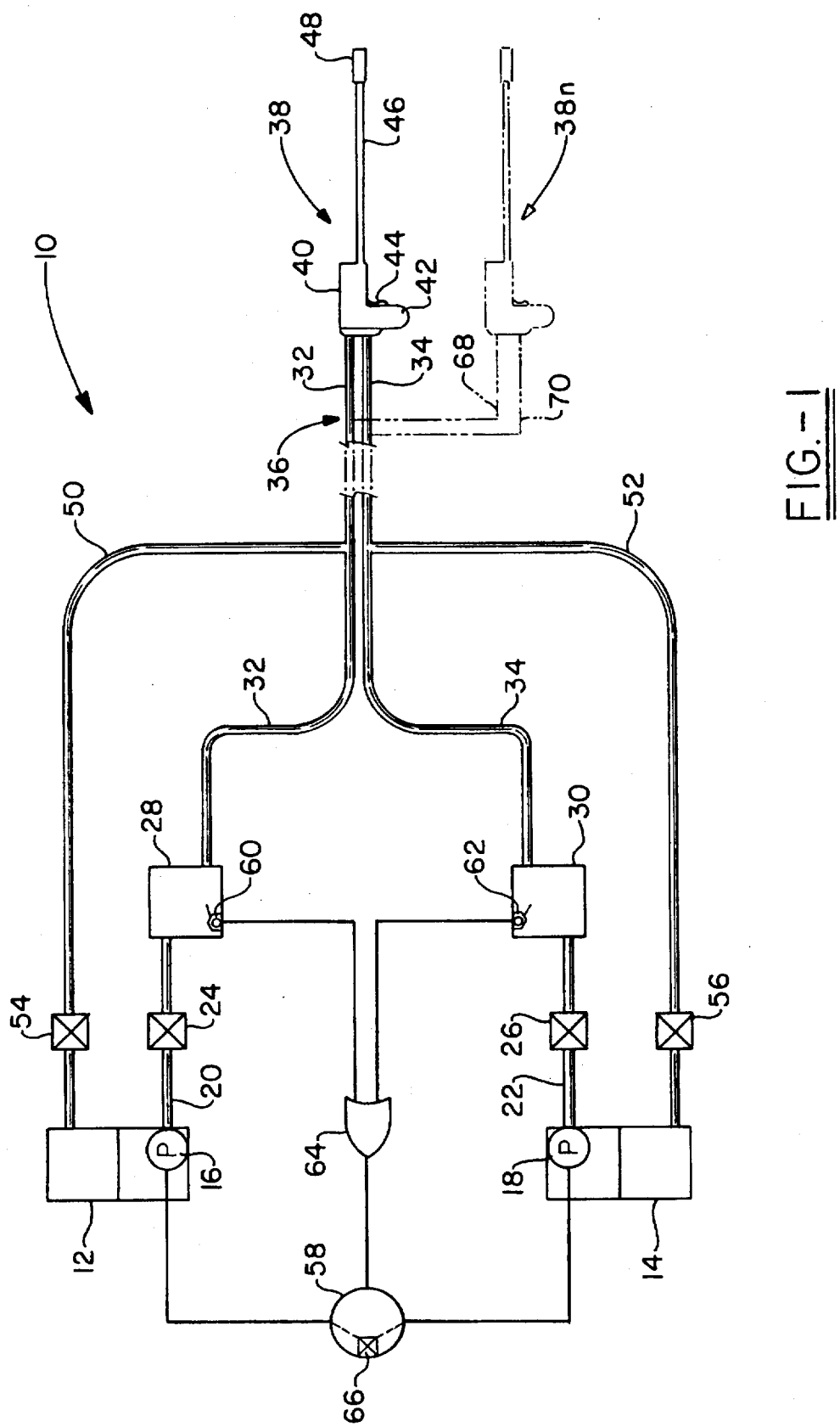
FIG. 1 is a schematic diagram of the germicide applicator for cow udders according to the invention.

Referring now to the drawing and more particularly FIG. 1, it can be seen that a germicide applicator for cow udders is designated generally by the numeral 10. The applicator 10 includes a supply 12 of a first ingredient, and a supply 14 of a second ingredient—the two ingredients being combined to form the desired germicide. It will be appreciated that in a preferred embodiment of the invention, the supply 12 receives lactic acid, while the supply 14 receives sodium chlorite. However, the concept of the invention is adaptable to implementation with any of a number of germicides of different constituent ingredients.

Received within the respective supplies 12, 14 are appropriate pumps 16, 18 adapted for driving the liquid contained within the respective supplies 12, 14 through associated conduits 20, 22. In the preferred embodiment of the invention, the pumps 16, 18 are pneumatic pumps, although pumps of various types or structures may be employed. The conduits 20, 22 interconnect the sources 12, 14 with associated reservoirs 28, 30, as shown. If desired, respective check valves 24, 26 may be interposed within the conduits 20, 22 to prevent any backflow from the reservoirs 28, 30 to the sources 12, 14. As will be appreciated later herein, the reservoirs 28, 30 are provided for the primary purpose of maintaining level sensors or float switches 60, 62.

Each of the reservoirs 28, 30 has an associated dispensing line 32, 34 which join together as a distribution manifold 36 which interconnects with the dispensing guns 38–38n.

Each of the dispensing guns 38–38n comprises a housing 40 having a handle and appropriate grip 42 extending downwardly therefrom. A trigger switch 44 is provided in association with the handle grip 42, for purposes which will become apparent later herein. A wand 46 extends from the housing 44 and provides a conduit for the final germicide solution as will be discussed below. A dispensing ring 48 is maintained at the end of the wand 46 and, as will be presented below, is adapted for germicide application to cow teats.

The manifold 36 also includes a return line 50 interconnecting the supply 12 with the dispensing line 32. Similarly, a return line 52 interconnects the supply 14 with the dispensing line 34. Valves 54, 56 are maintained in the respective return lines 50, 52 in regions which are preferably near the supplies 12, 14. In the preferred embodiment of the invention, the valves 54, 56 are manually actuated.

With continued reference to FIG. 1, it can be seen that a pressure source 58 interconnects with the pumps 16, 18 and provides the appropriate means for actuating the same. In the preferred embodiment of the invention, with the pumps 16, 18 being pneumatically controlled, the source 58 is a source of air pressure. Of course, it could be any suitable source of pump actuation.

Received within the reservoirs 28, 30 are respective float switches 60, 62. As will be readily understood by those skilled in the art, the float switches 60, 62 emit an output signal when the fluid level in the associated reservoir drops below a predetermined level. The outputs of the float switches 60, 62 are applied to a logic OR gate 64, as shown. Of course, any suitable logic type device can be used to achieve the desired purpose. In any event, the output of the OR gate 64 is connected to the pressure source 58, as shown. Accordingly, when the fluid level in either of the reservoirs 28, 30 drops below a predetermined level, the output of the associated float switch 60, 62 causes the OR gate 64 to emit an output signal which turns off the pressure source 58, thus deactivating both of the pumps 16, 18 and inhibiting dispensing of either ingredient. An override switch 66 is provided in association with the pressure source 58 such that the pumps 16, 18 can be manually activated even when turned off by virtue of the output of the OR gate 64.

With continued reference to FIG. 1, it can be seen that it is contemplated that a plurality of dispensing guns 38–38n may be incorporated with the germicide applicator 10. As shown in phantom, dispensing lines 68, 70 may be passed to any number of other dispensing guns, such that each milking stall may be provided with its own dispensing gun 38, if desired. Accordingly, the invention contemplates a single dispensing gun or plural dispensing guns operating from a single dispenser station.

Figure 2:
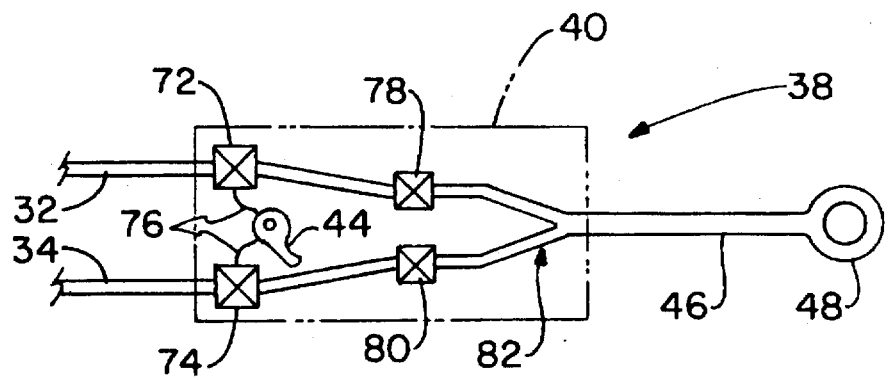
FIG. 2 is an illustrative view of the dispensing gun employed in accordance with the invention.

With reference now to FIG. 2, an appreciation may be obtained respecting the internal structure of the dispensing gun 38. As shown, the dispensing lines 32, 34 of the manifold 36 are each provided with respective dispensing valves 72, 74. The dispensing valves 72, 74 are connected by a common linkage 76 to the trigger switch 44. Accordingly, actuation of the trigger switch 44 opens each of the valves 72, 74 to allow passage of the respective liquid materials (lactic acid and sodium chlorite) into the mixing station. It will be appreciated that the constituent materials are presented through the lines 32, 34 under pressure via the associated pumps 16, 18. The actual volume of each of the constituent materials which is dispensed may be controlled in any of a number of ways, including the diameters of the dispensing lines 32, 34 or the valve openings of the associated valves 72, 74. If desired, even the pumps 16, 18 can be individually sized or controlled. Suffice it to say that when the trigger 44 is actuated, the common linkage 76 opens valves 72, 74 such that appropriate relative quantities of the materials pass therethrough from the dispensing lines 32, 34. The materials flow through respective check valves 78, 80 in order to assure that there is no backwash from either material into the other, or of blended germicide material into either component. As shown, the dispensing lines 32, 34 interconnect in a "Y" connector 82 to join with the wand 46. The actual blending and mixing of the lactic acid and sodium chlorite occurs at the junction of the legs of the Y connector 82. Accordingly, the highly corrosive low-shelf life blended germicide material does not exist until entry into the wand 46.

Figure 3:
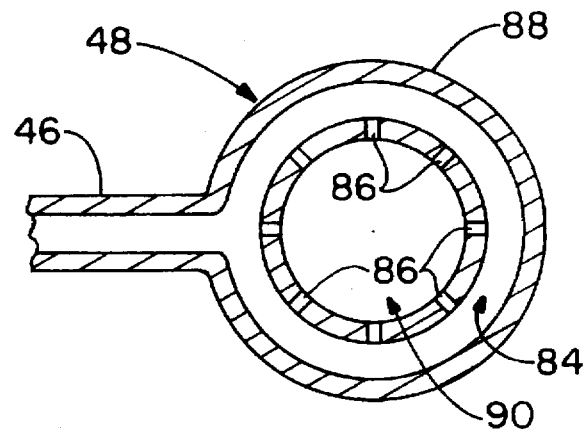
FIG. 3 is a sectional view of the dispensing ring employed with the concept of the invention.

With reference now to FIG. 3, it can be seen that the dispensing ring 48 comprises an annular housing 88 having an opening 90 passing centrally therethrough. The annular housing 88 has a circular cavity or bore 84 therein which communicates with the wand 46 and thereby receives under pressure the blended germicide composition. A plurality of apertures or bores 86 are uniformly circumferentially spaced about the interior of the opening 90 and communicate with the circular cavity 84. The apertures 86 serve to spray the germicide mixture inward of the opening 90. While the apertures 86 may themselves serve as spray nozzles, it is also contemplated that the bores 86 actually comprise individual spray nozzles or atomizers, if desired. With the bores or atomizers 86 having a fan pattern coveting 120°, three such bores or atomizers are sufficient to completely encircle a teat. According, in the preferred embodiment of the invention, the opening 90 is fully engulfed in a mist of germicide material when trigger 44 actuates the valves 72, 74 through the linkage 76.

It will be appreciated that the opening 90 is sized to accommodate receipt of a cow's teat, while allowing enough clearance between the teat and the opening 90 of the annular housing 88 to assure that the teat is fully covered with the germicide mist. In this regard, the opening 90 should have a diameter of between 2 and 4 inches.

Those skilled in the art will appreciate that the germicide mixture is not harmful to the cow itself. However, both lactic acid and sodium chlorite can, by themselves, injure the cow. Accordingly, a safeguard is provided to assure that the germicide applicator 10 shuts down in the event that there is not an adequate mount of either ingredient in the associated reservoirs 28, 30. In this regard, the float switches 60, 62 operate through the OR gate 64 to disable the power or pressure source 58 in the event that an inadequate mount of either ingredient is present in the associated reservoir.

After shutdown by actuation of either of the float switches 60, 62, the germicide applicator 10 may be reactivated after the associated supply 12, 14 has been refilled. The override button 66 causes the pumps 16, 18 to restart and, with the appropriate reservoir 28, 30 then refilling, the state of the triggered float switch changes such that pressure or power source 58 remains in the activated state. During this same time, the associated feedback valves 54, 56 may be opened to purge the associated dispensing line 32, 34 of any air pockets which might have been introduced thereinto. It will be appreciated that the valve 54 allows the dispensing line 32 to feed back through the feedback line 50 to the supply 12. By making one complete purge of the line 32 between the supply 12 and the valve 54, all air can be purged from the line. With the lines 32, 34 of a clear plastic material, visual confirmation of the purging of the lines can be made. Of course, the same is true with respect to the dispensing line 34 by use of the purge valve 56.

It should be appreciated that the absence of a sufficient quantity of either of the constituent ingredients will shut down the system 10, with means thus being provided for replenishing the appropriate ingredients and purging the lines of air for immediate reentry into service.

Figure 4:
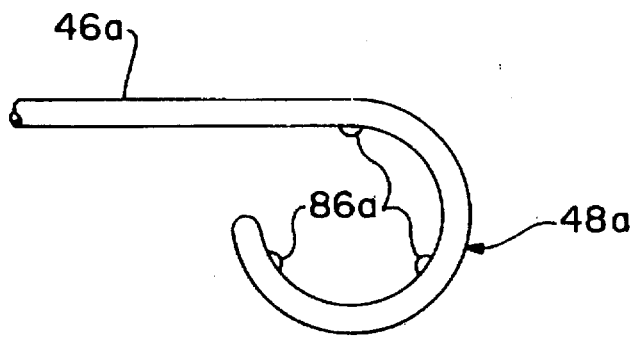
FIG. 4 is a top plan view of an alternate embodiment of the dispensing wand.

With reference to FIG. 4, it can be appreciated that the dispensing ring may be formed directly from the wand itself. Here, the wand 46a, of stainless steel or the like, is formed to define a dispensing ring 48a at the end thereof. Specifically, the ring 48a is formed as a crook at the end of the wand 46 and, as such, may be used to separate, manipulate or maneuver the teats to facilitate accessing the teats for treatment. The atomizers 86a assure full coverage of the teats with the germicide.

Figure 5:
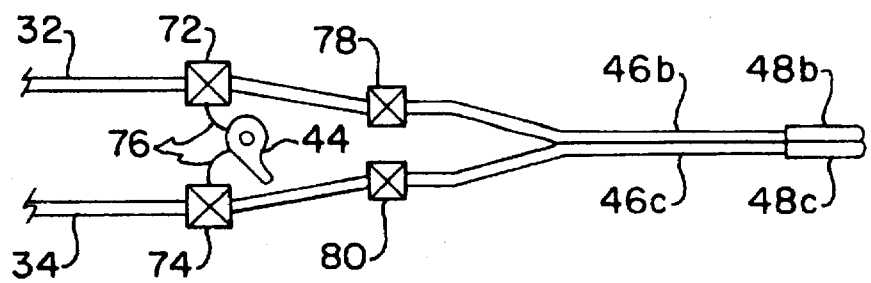
FIG. 5 is an illustrative view of the dispensing gun according to an alternative embodiment of the invention.

It is also contemplated that the dispensing gun and wand may be configured such that the ingredients of the germicide mix in the air, apart from both the dispensing gun and the teat. As shown in FIG. 5, each of the dispensing lines 32, 34 may join with respective wands 46b, 46c, each with its own dispensing ring 48b, 48c. Here, the wands 46b and 46c are substantially the same as the ring 48a, and the spray tings 48b, 48c are substantially congruent and substantially the same as the ting 48a. The atomizers 86a employed in the dispensing rings 48b and 48c are configured and directed such that the respective ingredients, lactic acid and sodium chlorite mix in flight in the air between the dispensing rings 48b, 48c and the teat. Accordingly, the corrosive mixture is nonexistent within the gun 38.

It should now be appreciated that the objects of the invention have been satisfied by the structure presented above. Mixing of the germicide ingredients is precluded until entry into the wand of the dispensing gun. Fail-safe means have been introduced to preclude the application of either of the ingredients singularly upon the cow. Additionally, a dispensing ring is employed such that dispensing of the germicide can be focused upon the teats themselves, minimizing waste and assuring full coverage. Moreover, the system is given to assuring that the appropriate mixture of ingredients is attained, that the ingredients are dispensed upon the appropriate body parts, that the majority of the system is isolated from the corrosive mixture, and that the system can be replenished and purged in a simple and cost effective manner.

While in accordance with the patent statutes only the best mode and preferred embodiment of the invention is being presented and described in detail, it is to be understood that the invention is not limited thereto or thereby. Accordingly, for an appreciation of the true scope and breadth of the invention reference should be made to the following claims.

What is claimed is:

1. A germicide applicator for cow udders, comprising:
   a plurality of supply sources for constituent ingredients of a germicide;
   a plurality of dispensing lines, a separate dispensing lines in communication with each of said supply sources at first ends thereof;
   a dispensing gun interconnected with said dispensing lines at second ends thereof;
   a separate pump in association with each of said supply sources for urging the constituent ingredients from said supply sources, through said dispensing lines, and out of said dispensing fun; and
   means interconnecting said plurality of dispensing lines for mixing the constituent ingredients into the germicide to be applied to a cow teat immediately prior to application so that the germicide is applied to the cow only in the proper mixture, and not in such a manner that any of the ingredients alone contacts the cow's udders.

2. The germicide applicator for cow udders according to claim 1, further comprising valve means operatively connected to said dispensing gun for selectively enabling the constituent ingredients to be discharged from said dispensing gun.

3. The germicide applicator for cow udders according to claim 2, wherein said dispensing gun comprises a dispensing ring having an opening sized to receive a cow teat.

4. The germicide applicator for cow udders according to claim 3, wherein said dispensing gun further comprises a wand, said dispensing ring being maintained at an end of said wand.

5. The germicide applicator for cow udders according to claim 4, wherein said dispensing ring is integral with and formed from an end of said wand.

6. The germicide applicator for cow udders according to claim 5, wherein said dispensing ring comprises a crook.

7. The germicide applicator for cow udders according to claim 4, wherein said means for mixing is interposed between said valve means and said dispensing ring.

8. The germicide applicator for cow udders according to claim 7, wherein said means for mixing comprises a "Y" connector interposed between said plurality of dispensing lines and said wand.

9. The germicide applicator for cow udders according to claim 7, wherein said valve means comprises a dispensing valve in each said dispensing line, and an actuator commonly connected to each of said dispensing valves, all of said valves constantly being in the same operative state.

10. The germicide applicator for cow udders according to claim 9, wherein said actuator comprises a manually actuated trigger connected to each of said valves through a common linkage.

11. The germicide applicator for cow udders according to claim 7, wherein said dispensing ring comprises an inner circumferential surface having spray apertures therein.

12. The germicide applicator for cow udders according to claim 11, wherein said dispensing ring further comprises a cavity interposed between said wand and said spray apertures.

13. A germicide applicator for cow udders, comprising:
- a plurality of supply sources for constituent ingredients of a germicide;
- a plurality of dispensing lines, a separate dispensing line in communication with each of said supply sources at first ends thereof;
- a dispensing gun interconnected with said dispensing lines at second ends thereof;
- pump means in association with each of said supply sources for urging the constituent ingredients from said supply sources, through said dispensing lines, and out of said dispensing gun;
- means interconnecting said plurality of dispensing lines for mixing the constituent ingredients into the germicide to be applied to a cow teat;
- a float switch in association with each of said supply sources, said float switches signalling when a volume of the constituent ingredients of the associated supply source is below a particular level; and
- control means interposed between said pumps and said float switches for inhibiting operations of all of said pumps in the event that any of said float switches indicates that the constituent ingredients of the associated supply source is below a particular level.

14. The germicide applicator for cow udders according to claim 13, wherein said control means further comprises a manual override for accommodating actuation of said pumps despite any of said float switches indicating that the constituent ingredients of the associated supply source is below said particular level.

15. The germicide applicator for cow udders according to claim 14, further comprising feedback lines interconnected between one of said sources and said second end of an associated dispensing line.

16. The germicide applicator for cow udders according to claim 15, further comprising valve means in each of said feedback lines for selectively interconnecting said second ends of said dispensing lines with an associated supply source for purging said dispensing lines.

17. A germicide applicator for cow udders, comprising:
- a plurality of supply sources for constituent ingredients of a germicide;
- a plurality of dispensing lines, a separate dispensing line in communication with each of said supply sources at first ends thereof;
- a dispensing gun interconnected with said dispensing lines at second ends thereof;
- said dispensing gun comprising a pair of wands adjacent and coextensive with each other, each said wand having a dispensing ring connected at an end thereof; and
- pump means in association with each of said supply sources for urging the constituent ingredients from said supply sources, through said dispensing lines, and out of said dispensing gun such that the constituent ingredients mix to form the germicide external to said wands.

18. The germicide applicator for cow udders according to claim 17, wherein said dispensing rings of said wands are substantially congruent with each other.

19. The germicide applicator for cow udders according to claim 18, wherein each of said pair of wands is connected to a different one of said dispensing lines.

* * * * *